UNITED STATES PATENT OFFICE.

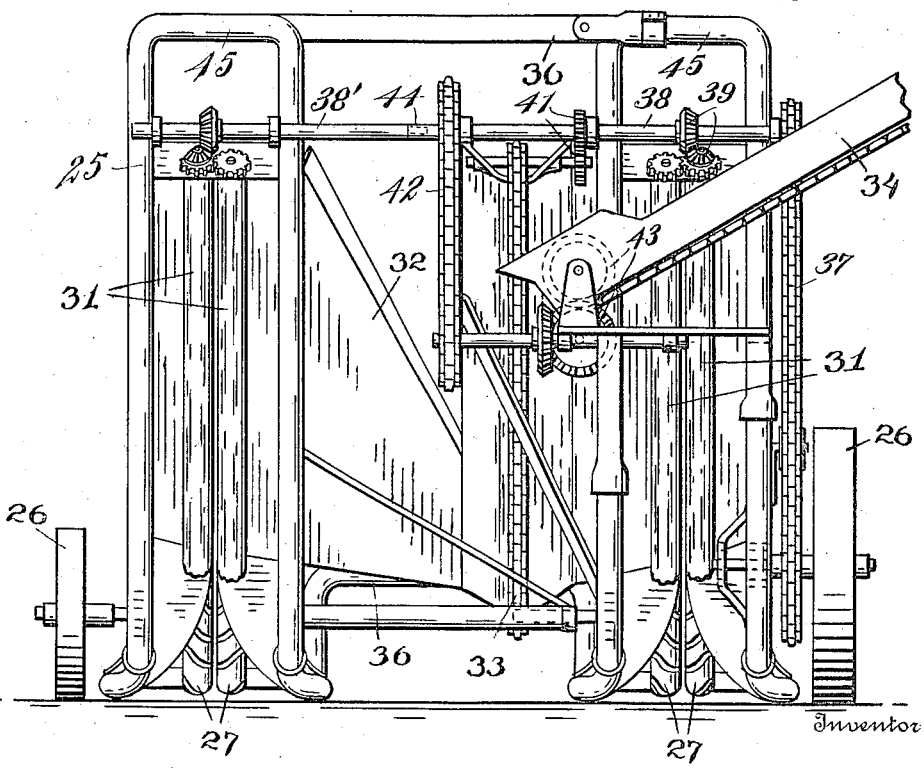

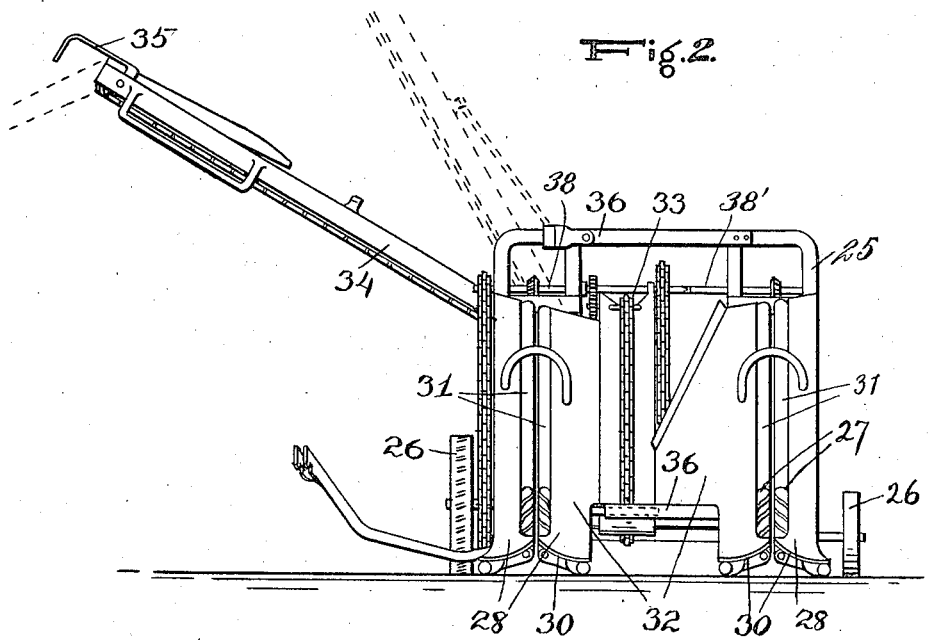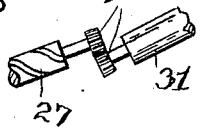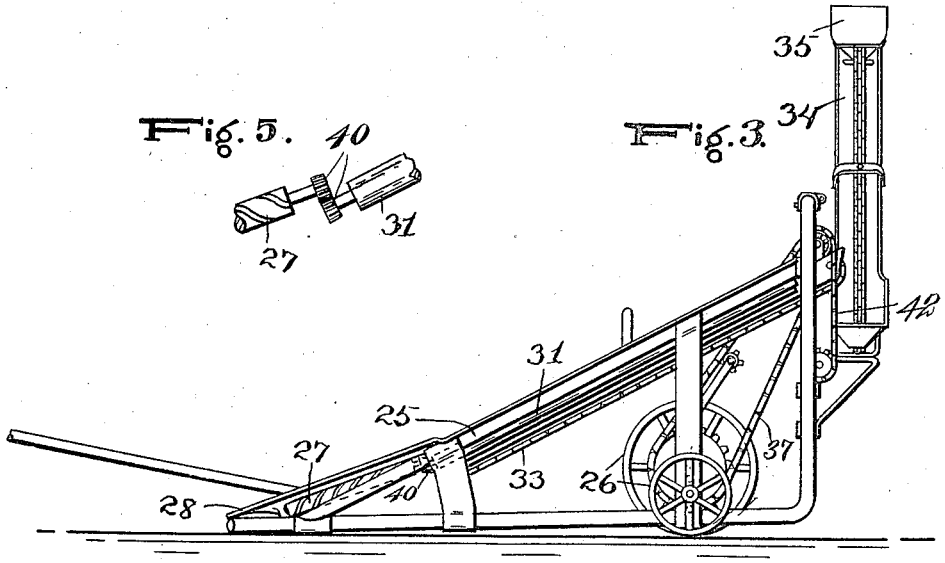

FRANK A. JOHNSON, OF INWOOD, IOWA.

CORN-HARVESTER.

1,172,289.

Specification of Letters Patent. Patented Feb. 22, 1916.

Application filed June 11, 1914. Serial No. 844,489.

*To all whom it may concern:*

Be it known that I, FRANK A. JOHNSON, a citizen of the United States, resident of Inwood, in the county of Lyon and State of Iowa, have made a certain new and useful invention in Corn-Harvesters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention as applied to a wagon, with parts broken away. Fig. 2 is a detail front view of the snapper and the elevator in rear of the same. Fig. 3 is a side view of the same. Fig. 4 is a rear view of the snapper, showing the elevator, with parts broken away. Fig. 5 is a detail side view of the gear connection between an auger roller and a snapper roller.

The invention has relation to corn harvesters, being designed to aline the cornstalks with the snapping mechanism for separate delivery thereto; to bring them to upright position, and to snap the ears from their stalks and leave all the stalks upright in the field.

The invention consists in the novel construction and combinations of parts, as hereinafter set forth.

In the accompanying drawings, illustrating the invention, the numeral 25 designates a supporting frame, mounted upon wheels 26 and carrying at its forward portion guide plates 28. These plates lie close to the ground and have rearwardly converging edges 30, terminating short of each other by an interval sufficient to allow the passage of a single cornstalk therebetween. Mounted in the frame 25, in rear of these guide plates and alined with said interval, is a pair of inclined auger or spiral grooved rollers 27, their front ends working close to the ground, adapted to pick up any stalks of corn which may not be standing and to bring them to upright position for passage to the snapping devices.

Inclined, corrugated snapping rollers 31 are mounted in the frame 25, in rear of said auger rollers, and terminate in rear at a height sufficient to snap the ears from the standing corn.

The snapped ears are guided by an inclined chute 32 to an endless conveyer 33, the rollers 31 being preferably mounted one higher than the other, in continuation of the incline of the chute. The conveyer 33 may deliver to a second conveyer 34, designed to discharge the ears of corn preferably into a divider box 1, attached to one side of a wagon, for separating the large and small ears of corn previous to the husking thereof by the rollers 8, 8' and 9, 9', referred to more particularly in my co-pending application for Letters Patent, Serial Number 23,451, said second conveyer being shown as pivotally mounted and provided with a guard or deflector 35 at its terminal portion.

The various rollers and conveyers are driven from one of the wheels 26, sprocket and chain connection 37 being shown between the axle of said wheel and a transverse shaft 38, adjacent to the upper ends of the rollers 31 and conveyer 33. The rollers 31 are driven by gearing connection 39 with shaft 38, these rollers in turn driving the auger rollers, by means of gears 40. Gear wheels 41 provide driving connection from shaft 38 to the drive shaft of conveyer 33, while conveyer 34 may be driven by means of sprocket and chain devices 42 and gearing 43.

The parts of the supporting frame which carry the opposite members of each pair of rollers are connected at their upper ends, at 45, and intermediately of their length by arched bars 46, the wheels 26 being mounted upon jack shafts, leaving a free way in rear of the rollers for the standing cornstalks.

A draft connection for the harvester is illustrated at 26', the draft as here shown operating from one side, in connection with a wagon.

Owing to the simplicity of construction and lightness of this machine, two or more rows of corn may be harvested simultaneously, without extraordinary demands upon the draft. For this purpose a second frame may be provided, having guide plates, auger rollers, snapping rollers and chute, as previously described. Coupling bars 36 serve to secure this supplemental frame in position parallel with the first-named supporting frame, one of the wheels 26 being removed from the latter and attached to the supplemental frame, and shaft 38' of the supplemental frame having jointed drive connection at 44 with shaft 38. The chute 32 of this supplemental frame is oppositely inclined with relation to the chute of the first-named frame, as is the pair of snapping rollers 31, serving to conduct the snapped ears of corn to the conveyer 33, common to both sets of snappers.

The machine is of especial advantage in that it straightens up and leaves standing all stalks in the cornfield; in that it is simple in construction and light of weight, and in that the stalks are presented one at a time to the snapping devices, and hence cause no added strain upon the machine and tax upon the draft.

What I claim is:

A corn harvester comprising a main supporting frame, longitudinal snapping rollers, a transverse drive shaft having driving connection with said rollers, an inclined feed chute laterally adjacent to said rollers, a conveyer at the lower lateral edge of said chute, a supplemental frame attachable to said first-named frame, snapping rollers in said supplemental frame, a transverse drive shaft upon said supplemental frame having jointed drive connection with said first-named shaft, a feed chute oppositely inclined to said first-named chute and terminating laterally adjacent to said conveyer, and coupling means for securing said supplemental frame to said first-named frame.

In testimony whereof I affix my signature, in presence of two witnesses.

FRANK A. JOHNSON.

Witnesses:
  HUGO REIMERS,
  BESSIE BALDWIN.

Copies of this patent may be obtained for five cents each, by addressing the "Commissioner of Patents, Washington, D. C."